United States Patent [19]

Eng et al.

[11] Patent Number: 4,479,971
[45] Date of Patent: Oct. 30, 1984

[54] GLYCERIDE FAT BASED CLOUDS FOR READY-TO-DRINK BEVERAGES

[75] Inventors: Jean L. Eng, Oshawa; Kathleen M. Mackenzie, Ajax, both of Canada

[73] Assignee: General Foods Inc., Ontario, Canada

[21] Appl. No.: 439,006

[22] Filed: Nov. 4, 1982

[51] Int. Cl.³ .................... A23L 2/00; A23L 2/02; A23L 3/34

[52] U.S. Cl. .................... 426/330; 426/330.5; 426/335; 426/590; 426/599; 426/602; 426/658

[58] Field of Search ............... 426/103, 590, 599, 602, 426/658, 330, 330.5, 335

[56] References Cited

U.S. PATENT DOCUMENTS

| | | |
|---|---|---|
| 3,023,106 | 2/1962 | Common . |
| 3,385,710 | 5/1968 | Reymond et al. . |
| 3,395,021 | 7/1968 | Glicksman et al. . |
| 3,658,552 | 4/1972 | Carlson et al. .................. 426/590 X |
| 3,660,105 | 5/1972 | Kesterson et al. ............... 426/590 X |
| 3,715,216 | 2/1973 | Wuhrmann et al. . |
| 3,959,510 | 5/1976 | Felton et al. .................... 426/590 X |
| 4,093,750 | 6/1978 | Babayan ........................... 426/250 |
| 4,187,326 | 2/1980 | Serafino et al. .................. 426/590 |
| 4,349,577 | 9/1982 | Tessler ............................. 426/590 |

*Primary Examiner*—Robert Yoncoskie
*Attorney, Agent, or Firm*—Thomas A. Marcoux; Linn I. Grim; Daniel J. Donovan

[57] ABSTRACT

A bland, colorless clouding agent is disclosed which comprises an emulsion of a glyceride fat, preferably cocoa butter or soy stearin, in an aqueous solution or dispersion of gum arabic. The glyceride fat cloud emulsion contains from 10% to 30% by weight of gum arabic, a gum arabic to glyceride fat ratio of from 3:1 to 5:1 by weight, and a water content of 70% to 90% by weight, based upon the weight of the emulsion. The clouding emulsion is preferably incorporated into a citrus-flavored, ready-to-drink beverage and it will remain suspended for 4 months or longer. The ready-to-drink beverage will preferably be of a pH from 2.5 to 4 and contain a juice content of from 10% to 35%.

18 Claims, No Drawings

4,479,971

GLYCERIDE FAT BASED CLOUDS FOR READY-TO-DRINK BEVERAGES

TECHNICAL FIELD

This invention relates to a clouding agent suitable for incorporation in a ready-to-drink beverage which results in a product having the appearance and mouthfeel of a natural juice.

BACKGROUND ART

Since the introduction into the marketplace of substitutes for natural fruit juices and the like, the art has long been faced with the problem of producing beverages which have the appearance, appeal, taste and mouthfeel of the natural fruit juices. The consumer appeal of natural juices having a cloudy appearance and pulpy mouthfeel has been difficult to achieve in the substitute products.

A wide variety of clouding agents have been previously suggested for imparting to beverages the opacity and palatability of freshly-squeezed fruit juices. Generally, these clouding agents comprise fats, oils or gums which are emulsifiable or dispersible in aqueous acidic media to provide a product having the opaque or cloudy appearance of natural fruit juices.

For example, U.S. Pat. No. 3,395,021 provides a clouding agent comprising a dispersion of a gum that is water-swellable in an aqueous medium containing a gum which is soluble in water. The degree of swelling of the water-swellable gum and the pulpiness of the resulting mixture is controlled by the water-soluble gum.

U.S. Pat. No. 3,023,106 relates to a clouding agent comprising a dried emulsion of a "plastic fat" and a hydrophilic encapsulating colloidal material such as water-soluble gum. The "plastic fat" contemplated by the disclosure is one that is semi-solid at room temperature, i.e., comprises a mixture of fats and oils at temperatures in the order of 60° F.

U.S. Pat. No. 3,715,216 describes an aqueous fruit beverage composition with a clouding agent composed of a fat and edible gum. The patent discloses that suitable fats are vegetable fats such as hydrogenated peanut oil.

The stability of the cloud-forming agent is critically important to the commercial acceptability of the product. The cloud should be one which will avoid settling out as a sediment or rising to the top of the beverage to form a ring. The present commercial clouds for ready-to-drink beverages generally separate out to form a ring or layer on the surface of the juice product. Accordingly, it has become standard practice to include "weighting agents" in the cloud to impart thereto the necessary stability to avoid ringing upon long periods of standing.

Until recently, the weighting of clouds for use in artificial juice products was achieved by employing brominated vegetable oils. The combination of the brominated vegetable oil and cloud yielded an agent which had the requisite specific gravity to impart stability to the cloud.

Studies, however, revealed that long-term exposure of living tissue to brominated vegetable oils resulted in an absorption of bromine therein. These toxicological studies have resulted in regulations which restrict the use of brominated vegetable oils. Other artificial weighting agents are allowed at only low levels, which can stabilize only a low level of clouding fats, resulting in a watery appearance and thin, watery mouthfeel.

Moreover, recent trends in the area of food substitutes toward only the utilization of natural ingredients has led the art on an extensive search for a natural clouding agent which does not require the use of "weighting agents" to impart stability thereto.

For citrus flavored beverages, particularly orange drinks containing juice solids, opacity can be obtained by addition of water extracted soluble orange solids which contain high levels of suspended pulp. The use of these materials is accompanied by fairly rapid sedimentation and the presence of objectionable flavor problems which limit the level of these materials and thus the degree of opacity achievable.

Accordingly, it is an object of the present invention to provide a natural clouding agent for incorporation in a ready-to-drink beverage mix which imparts the appearance, opacity, texture and mouthfeel thereto of a natural juice product and which would remain physically stable without the necessity for a "weighting agent."

DISCLOSURE OF THE INVENTION

The present invention is predicated on the discovery that a glyceride fat, when emulsified in an aqueous dispersion or solution of gum arabic, has the requisite physical attributes to form a stable cloud in an acidic ready-to-drink substitute juice product. It has been discovered that the use of such a clouding agent results in a product having a long shelf-life and stability not achievable heretofore without the utilization of a "weighting agent."

Inasmuch as the glyceride fat is a natural product, the utilization of this material as a cloud-forming agent results in a beverage product having fewer artificial components than natural juice substitute products heretofore available in the marketplace.

BEST MODE FOR CARRYING OUT THE INVENTION

The invention includes a method of forming the clouding agent comprising forming a solution or dispersion of gum arabic in water and heating the solution or dispersion to a temperature sufficient to liquify the glyceride fat, a temperature above about 40° C. to 65° C., heating the glyceride fat to a temperature within the aforementioned range and subsequently emulsifying the heated glyceride fat in the heated aqueous dispersion or solution of gum arabic. Alternatively, the solution or dispersion of gum arabic in water may be combined with the glyceride fat, and the combination of the solution or dispersion of gum arabic in water and the glyceride fat is heated to a temperature sufficient to liquify the glyceride fat, a temperature above about 40° to 65° C. and subsequently emulsifying the heated combination. Upon cooling, the resulting emulsion is a bland, colorless, creamy liquid which may be directly incorporated into a ready-to-drink aqueous beverage product.

Inasmuch as no weighting agents are required to impart stability to the cloud, the clouding agent of the present invention may be added to beverage products at an unrestricted level resulting in cloud appearances and mouthfeel characteristics heretofore unachievable and much closer to those of natural juice products.

The two types of glyceride fat base ingredients which have proved to be effective as clouding agents are cocoa butter, preferably deodorized cocoa butter, (DCB) and soy stearin. It is surprising that two commercial confectionary fats which are compositionally similar to DCB, Coberine and Choclin, did not exhibit the same degree of physical and organoleptic stability as DCB, even though both substances are considered by the industry to be cocoa butter equivalents or subtitutes based upon their physical and chemical characteristics.

Soy stearin when used in the clouding agent of the present invention is extremely stable to oxidative rancidity. The waxy mouthfeel associated with high melting fats has not been noticed in beverages clouded with soy stearin, particularly when it is used in juice containing beverages. The soy stearin has a much higher specific turbidity (i.e. lower percentage transmittance at the same use level) than DCB. While the exact reason is not understood this phenomena allows for the use of a much lower level of cloud in the ready-to-drink beverage.

In a preferred embodiment, an edible preservative is added to the aqueous solution or dispersion of gum arabic prior to addition of the glyceride fat. Suitable preservatives include sodium meta bisulfite, potassium sorbate, sodium benzoate and methyl-, propyl- or heptoparahydroxybenzoate. Since certain preservatives, most notably potassium sorbate, require a small amount of acid present in order to be effective to prevent microbial growth, citric acid may also be added.

A combination of proper homogenization pressure and gum arabic to glyceride fat ratios is an important factor in achieving cloud stability in a ready-to-drink beverage. Cocoa butter and soy stearin require high homogenization pressures and high gum to fat ratios for maximum physical stability. The homogenization pressures will vary between 3,000 to 7,000 psig, preferably from 4,000 to 6,000 psig. With a Manton Gaulin lab homogenizer, the conditions for best physical stability for the soy stearin and cocoa butter clouds were a ratio of 4:1 gum arabic to glyceride fat and a homogenization pressure of 5,000 psi, recycled for five passes through the homogenizer.

Generally, the resulting liquid emulsion contains from 10% to 30%, by weight, of gum arabic and an gum arabic:glyceride fat ratio from 5:1 to 3:1, by weight, with a water content of 70% to 90%, by weight, based on the weight of the emulsion. Preferably, the resulting emulsion contains 20% to 25%, by weight, of gum arabic and a gum arabic to glyceride fat ratio of 4.5:1 to 3.5:1, by weight, and a water content of 75% to 80%, by weight, based on the weight of the emulsion.

Gum arabic in the emulsion system functions as an edible natural encapsulant. Other edible natural encapsulants can be substituted for gum arabic if necessary but will not achieve the optimum opacity and long-term storage stability. Pectin can be incorporated as an encapsulant in the clouding emulsion to yield a stable cloud, however, it suffers from the disadvantage that it thickens the beverage to an undesirable extent with both soy stearin and DCB. Additionally, a 2% pectin solution has comparable viscosity to a 20% gum arabic solution. This implies a 10 fold increase in the quantity of cloud required for the same opacity. The bulk of the emulsion involved to achieve the desired opacity renders the pectin system economically unfeasible. Starch as an encapsulant did not exhibit the long term stability attributable to those obtained with gum arabic. Both ringing and sedimentation in the form of floc-like white precipitate occured during storage.

It is to be understood that the liquid emulsion cloud-forming agent may be incorporated in an aqueous ready-to-drink beverage which comprises juice solids, edible acids, sugar and flavoring and coloring ingredients already in admixture with water. Generally, the liquid emulsion clouding agent is mixed into a ready-to-drink beverage, preferably one which is citrus-flavored, so as to constitute from about 0.1% to 4%, by weight thereof, preferably 1.5% to 2.5%. The specific amount of cloud-forming agents utilized in each instance will depend upon the type of fruit juice contemplated.

It has been found that when the clouding emulsions of the present invention are added to a fruit juice containing system to augment the opacity contributed by the juice solids, the physical stability of the glyceride fat clouds is significantly enhanced as compared to non-juice systems. The glyceride based cloud of this invention may be incorporated into a ready-to-drink beverage containing from 0 to 5% juice content, preferably from 10 to 35%. These clouds when used at high opacity levels at a level of 200 ppm glyceride fat or greater also contribute a degree of body and thicker mouthfeel and affect overall flavour delivery.

The glyceride based cloud of the present invention is preferably incorporated into a ready-to-drink, citrus-flavored beverage of a pH within the range of 2.5 to 4.0, preferably 3.5 to 4.0. In a ready-to-drink lemonade flavored beverage of pH 2.8 which was non-buffered, no rancid fat or oxidized flavors were detected after six months of storage at ambient temperatures.

The clouding emulsion will contain no particles above 3 microns, preferably it will contain no particles in excess of 1.5 microns. The glyceride based clouding emulsion is bland and will exhibit four month or greater stability when incorporated in a ready-to-drink liquid beverage. After the four-month period (undisturbed and stored at room temperature) the glyceride based clouding emulsion remained suspended in a ready-to-drink, juice containing beverage and there was no sign of separation or ringing.

The invention will be illustrated by the following non-limiting examples.

EXAMPLE 1

140.0 grams of gum arabic were mixed with 523.3 grams of water, which contained 0.7 grams of potassium sorbate and 1.05 grams of citric acid, added in that order. The mixture was heated to 40°-45° C. 35 grams of 100% deodorized cocoa butter were also heated to 40°-45° C. The hot cocoa butter was added to the hot gum arabic solution and the mixture homogenized at 5,000 psi for 5 minutes at a flow rate of 1000 ml/min to yield a liquid emulsion of cocoa butter in edible gum.

The clouding agent was added to a non-carbonated lemon-flavored drink in an amount of 0.4%, by weight, to yield a product having the appearance and mouthfeel of lemonade made from the juice of fresh lemons.

EXAMPLE 2

140.0 grams of gum arabic were mixed with 523.3 grams of water, which contained 0.7 grams of potassium sorbate and 1.05 grams of citric acid, added in that order. The mixture was left to deaerate for 1 hour, and was then heated to 50° C. 28 grams of deodorized cocoa butter were also heated to 50° C. The hot cocoa butter and 7 grams of citrus flavor oil were added to the hot gum arabic solution. The mixture was homogenized at 5,000 psi for 5 minutes at a flow rate of 1000 ml/min to yield a liquid emulsion of cocoa butter and citrus oils in edible gum.

The cloud emulsion was added to a non-carbonated drink base in an amount of 0.9%, to yield a product having the appearance and mouthfeel of lemonade made from the juice of fresh lemons.

EXAMPLE 3

In a similar manner as discussed in the above examples, a cocoa butter cloud emulsion was prepared which was composed of the following ingredients expressed as a percentage by weight based upon the weight of the emulsion.

| Ingredient | % |
| --- | --- |
| Water | 76.00 |
| Potassium sorbate (Preservative) | 0.10 |
| Citric Acid (Food Acid) | 0.15 |
| Gum Arabic | 19.00 |
| Cocoa Butter | 4.75 |
| | 100.00 |

The cocoa butter cloud emulsion was incorporated into a citrus-flavored, ready-to-drink beverage which had a pH of 3.8 and a 10% juice content and which had the following compositional make-up expressed as a percentage by weight based upon the weight of the beverage.

| Beverage Ingredient | % |
| --- | --- |
| Sucrose | 9.3 |
| Food Grade Acids | 0.6 |
| 65° Brix Orange Concentrate | 1.8 |
| Food Grade Buffer | 0.5 |
| Food Color | 0.001 |
| Flavor Oil Emulson | 0.1–0.2 |
| Cocoa Butter cloud emulsion | 0.4–1.7 |
| Water | to 100% |

EXAMPLE 4

140.0 g of gum arabic were mixed with 523.3 g water, which contained 0.7 g of potassium sorbate and 1.05 g of citric acid, added in that order. The mixture was left to deareate for 1 hour and was then heated to 75° C. 35 g of soy stearin were also heated to 75° C. The melted soy stearin was added to the hot gum arabic solution and the mixture homogenized at 5,000 psi for 5 minutes at a flow rate of 1,000 ml/min. to yield a liquid emulsion of soy stearin in edible gum.

The clouding agent was added to a non-carbonated lemon-flavored drink in a amount of 0.4% by weight, to yield a product having the appearance and mouthfeel of lemonade made from the juice of fresh lemons.

EXAMPLE 5

In a similar manner as discussed in Example 4, a soy stearin cloud was prepared which was composed of the following ingredients expressed as a percentage by weight based upon the weight of the emulsion.

| Ingredient | % |
| --- | --- |
| Water | 76.00 |
| Potassium sorbate | 0.10 |
| Citric Acid | 0.15 |

-continued

| Ingredient | % |
| --- | --- |
| Gum Arabic | 19.00 |
| Soy Stearin | 4.75 |
| | 100.00 |

The soy stearin cloud emulsion was incorporated into a citrus-flavored, ready-to-drink beverage which had the following compositional make-up expressed as a percentage by weight based upon the weight of the beverage.

| Beverage Ingredient | % |
| --- | --- |
| Sucrose | 9.3 |
| Food Grade Acids | 0.6 |
| 65° Brix Orange Concentrate | 1.8 |
| Food Grade Buffer | 0.5 |
| Food Color | 0.001 |
| Flavor Oil Emulson | 0.1–0.2 |
| Soy Stearin Cloud Emulsion | 0.4–1.7 |
| Water | to 100% |

We claim:

1. A glyceride fat based clouding emulsion which comprises gum arabic and a glyceride fat selected from the group consisting of soy stearin and cocoa butter wherein a gum arabic to glyceride fat ratio from 3:1 to 5:1 by weight is present, and a water content of 70% to 90% by weight, based upon the weight of said emulsion.

2. The product of claim 1 containing a gum arabic to glyceride fat ratio of from 3.5:1 to 4.5:1 by weight, and a water content of from 75% to 80% by weight, based upon the weight of said emulsion.

3. The product of claim 1 wherein the glyceride fat is deodorized cocoa butter.

4. The product of claim 1 additionally containing an edible preservative selected from the group consisting of potassium sorbate, sodium benzoate, sodium meta bisulfite, methylparahydroxybenzoate, propylparahydroxybenzoate and heptoparahydroxybenzoate.

5. A ready-to-drink beverage containing the glyceride fat based clouding emulsion of claim 1 at a level of incorporation of from 0.1% to 4% by weight of said beverage.

6. The ready-to-drink beverage of claim 5 wherein said beverage is citrus-flavored.

7. The ready-to-drink beverage of claim 6 wherein the level of incorporation varies from 1.5% to 2.5% by weight of said beverage and the glyceride fat is deodorized cocoa butter.

8. The ready-to-drink beverage of claim 6 which is of a pH of from 2.5 to 4.0.

9. The ready-to-drink beverage of claim 8 wherein the pH is from 3.5 to 4.0.

10. The ready-to-drink beverage of claim 6 which additionally contains from 0% to 50% juice content.

11. The ready-to-drink beverage of claim 10 which contains from 10% to 35% juice content.

12. A method of producing a bland, colorless, glyceride fat based clouding emulsion comprising:
(a) forming a solution or dispersion of 10% to 30% by weight gum arabic in water and heating said solution or dispersion above 40° C. to 65° C.;
(b) heating a glyceride fat selected from the group consisting of soy stearin and cocoa butter to a temperature above 40° C. to 65° C.;

(c) combining the solution or dispersion of gum arabic of step (a) with the heated glyceride fat of step (b) in amounts wherein the gum arabic to glyceride fat ratio from 3:1 to 5:1 by weight;

(d) emulsifying the combination of step (c) by subjecting the combination to homogenization pressures of from 3,000 to 7,000 psig.

13. The method of claim 12 wherein said glyceride fat is deodorized cocoa butter.

14. The method of claim 12 wherein said homogenization pressures are from 4,000 to 6,000 psig.

15. The method of claim 12 further comprising the addition of an edible preservative selected from the group consisting of potassium sorbate, sodium benzoate, sodium meta bisulfite, methylparahydroxybenzoate, propylparahydroxybenzoate and heptoparahydroxybenzoate.

16. A method of producing a bland, colorless, glyceride fat based clouding emulsion comprising:

(a) combining a solution or dispersion of 10% to 30% by weight gum arabic in water with a glyceride fat selected from the group consisting of soy stearin and cocoa butter in amounts wherein the gum arabic to glyceride fat ratio is from 3.5:1 to 4.5:1 by weight;

(b) heating the combination to a temperature above 40° C. to 65° C.; and (c) emulsifying the heated combination by subjecting said combination to homogenization pressures of from 3,000 to 7,000 psig.

17. The method of claim 16 wherein said glyceride fat is deodorized cocoa butter.

18. The method of claim 16 wherein said homogenization pressures are from 4,000 to 6,000 psig.

* * * * *